US006140713A

United States Patent [19]

Stringwell

[11] Patent Number: 6,140,713
[45] Date of Patent: Oct. 31, 2000

[54] ELECTRICAL CAMMED SWITCH

[75] Inventor: Roderick W. Stringwell, Keokuk, Iowa

[73] Assignee: Methode Electronics, Inc., Chicago, Ill.

[21] Appl. No.: 09/260,900

[22] Filed: Mar. 2, 1999

[51] Int. Cl.[7] .................... B60L 1/00; B60L 3/00

[52] U.S. Cl. .................... 307/10.1; 318/280

[58] Field of Search .................... 200/5 A, 6 B, 200/6 R, 27 R, 30 R, 21, 61.56, 275; 307/9.1, 10.1

[56] References Cited

U.S. PATENT DOCUMENTS

| | | | |
|---|---|---|---|
| 2,720,561 | 10/1955 | Nelson | 200/30 |
| 3,501,599 | 3/1970 | Horecky | 200/16 |
| 4,436,970 | 3/1984 | Swisher | 200/16 |
| 4,733,026 | 3/1988 | Wehrle | 200/38 D |
| 4,837,411 | 6/1989 | Best | 200/5 |
| 4,899,063 | 2/1990 | Suck | 200/5 |
| 5,412,166 | 5/1995 | Krupp et al. | 200/6 |
| 5,559,375 | 9/1996 | Jo et al. | 307/10.1 |
| 5,912,537 | 6/1999 | Yang | 318/280 |

*Primary Examiner*—Stephen W. Jackson
*Assistant Examiner*—Andre A. Henry
*Attorney, Agent, or Firm*—David L. Newman

[57] ABSTRACT

According to the present invention, underneath a vehicle power window button face a pair of cams are sized such that depression of the face a first distance causes momentary window movement whereas depression of the face a second distance causes express window movement. In the alternative, bumpers for receiving the cams and causing switch actuation can be sized or contoured such that depression of the face a first distance causes momentary window movement whereas depression of the face a second distance causes express window movement.

20 Claims, 3 Drawing Sheets

ELECTRICAL CAMMED SWITCH

TECHNICAL FIELD

The present invention relates to an electrical cam switch such as a vehicle power window switch.

BACKGROUND

Power windows are now commonly offered in many motor vehicles such as automobiles and trucks. Such power windows usually incorporate at least one DC motor for driving the window up and down in response to an operator actuatable switch. The current required to drive such motors is usually fairly high, and most often well above that which would ordinarily be capable of being transmitted by printed circuit boards. As is well known, conventional printed circuit boards have traditionally been limited to low current applications where currents are kept generally below about 0.5 amps. The current typically required for driving motors associated with power window control circuits is generally ranges from about 20 to 80 amps.

Heretofore, the standard approach to automotive switch control design has involved insert molding technology. This involves using a plurality of independent brass or copper lead frames (i.e., conductors) to carry high electrical current between a vehicle wiring harness and the switch contacts of an operator accessible switch control. These lead frames are typically imbedded in a plastic body or substrate. This process generally requires specialized injection mold tooling and techniques which can accommodate variously shaped and sized lead frames. Frequently, "two shot" molding is required in which the plastic material above and below the portions of the lead frame is injected into the mold in sequential steps. Such apparatus and procedures are relatively expensive and time consuming and add to the complexity and cost of power window control circuits in view of the increased tooling expense required to produce such assemblies. Also, the plastic body portion described above is typically restricted to accommodating only the lead frames and associated switch contacts. Thus, a separate printed circuit board is typically needed for the electronic components of the control circuit. This also significantly increases the overall cost of the control circuit.

In the conventional applications of a power window switch for an automobile, an operation of a power source has been conducted by a construction of mechanical seesaw type as it were, because of direct make and break of a load using alloy contacts the excessive starting current which occurs at the initial switching causes an arc discharge when alloy contacts contact each other, and for this reason faces of a traveling contact and a fixed contact are damaged to be uneven so a contact operation becomes unstable, and repeated operations shorten the life of a switch. Besides the shortcoming above mentioned conventional mechanical power window switches have another shortcoming. Conventional switches use an elastic spring in order to return a button once pushed so the touch is not agreeable.

Another power window switch is shown in U.S. Pat. No. 4,899,063 to Suck. In Suck, a power window switch for an automobile having a switching mechanism which includes a fixed contact plate and a circuit board secured within the inside of a resinous casing, the casing including a port. Positioned above the port is a button which includes a sloped elastic portion having its outer edge secured to the casing around the port. Compression of the button's sloped elastic portion places a conductive rubber contact attached to the bottom surface of the button into contact with a fixed contact on the fixed contact plate. The circuit board includes a switching circuitry which is responsive to variations in position of the button and attached conductive rubber contact.

Another is shown in U.S. Pat. No. 5,412,166 to Krupp. A power switch control module for a power window control circuit of a motor vehicle. The control module incorporates a printed circuit board, a plurality of switch contacts secured to the printed circuit board, a plurality of connector terminals also secured to the printed circuit board, a plurality of high current traces formed on an upper surface of the printed circuit board for coupling selected pairs of the switch contacts and connector terminals electrically together, and a switch control. The switch control is mounted in a frame member for pivotal movement relative to the printed circuit board and is movable between up and down positions. When in the up position the switch control electrically couples a first selected pair of switch contacts and when in the down position the switch control electrically couples a second selected pair of the switch contacts. The high current traces are capable of handling about 20–80 amps of current. Since the high current traces are formed on the upper surface of the printed circuit board, no injection molding, tooling or techniques are required for construction of the module as typically required with prior art control modules. Also, the undersurface of the printed circuit board can advantageously be used to mount other electronic components of the control circuit.

Angular or linear travel on window lift switches is accomplished by rocker or toggle switches which require more travel than low profile snap domes or snap switch blades will allow. That travel is typically 4–6 degrees. However, a design may require as much as 18 degrees travel through a second detent to operate a second switch contact in overtravel, momentary or latching operation. Present low current "snap dome" contactors and high current snap blade switches usually have a preload driver from button to dome, either direct with a silicone layer or nipple interface. Travel angle in such cases is usually limited to 6 degrees to full travel. More than that could damage, flatten or fracture connectors of the dome or snap blade type.

SUMMARY OF THE INVENTION

It is an object of the present invention to provide a device with variable pretravel to operate, overtravel, pretravel to a second operation position.

It is an object of the invention to obtain a double detent operation without damage to a lightweight snap blade or snap dome contactor that will not tolerate overtravel, and provide increased button travel using a contactor that has limited travel to operate with no overtravel possible without damage to the contactor.

According to the present invention, underneath a vehicle power window button face a pair of cams are sized such that depression of the face a first distance causes momentary window movement whereas depression of the face a second distance causes express window movement. In the alternative, bumpers for receiving the cams and causing switch actuation can be sized or contoured such that depression of the face a first distance causes momentary window movement whereas depression of the face a second distance causes express window movement.

These and other objects, features and advantages will become more apparent in light of the following text and drawings.

DETAILED WRITTEN DESCRIPTION OF PREFERRED EMBODIMENT

Figure 1:
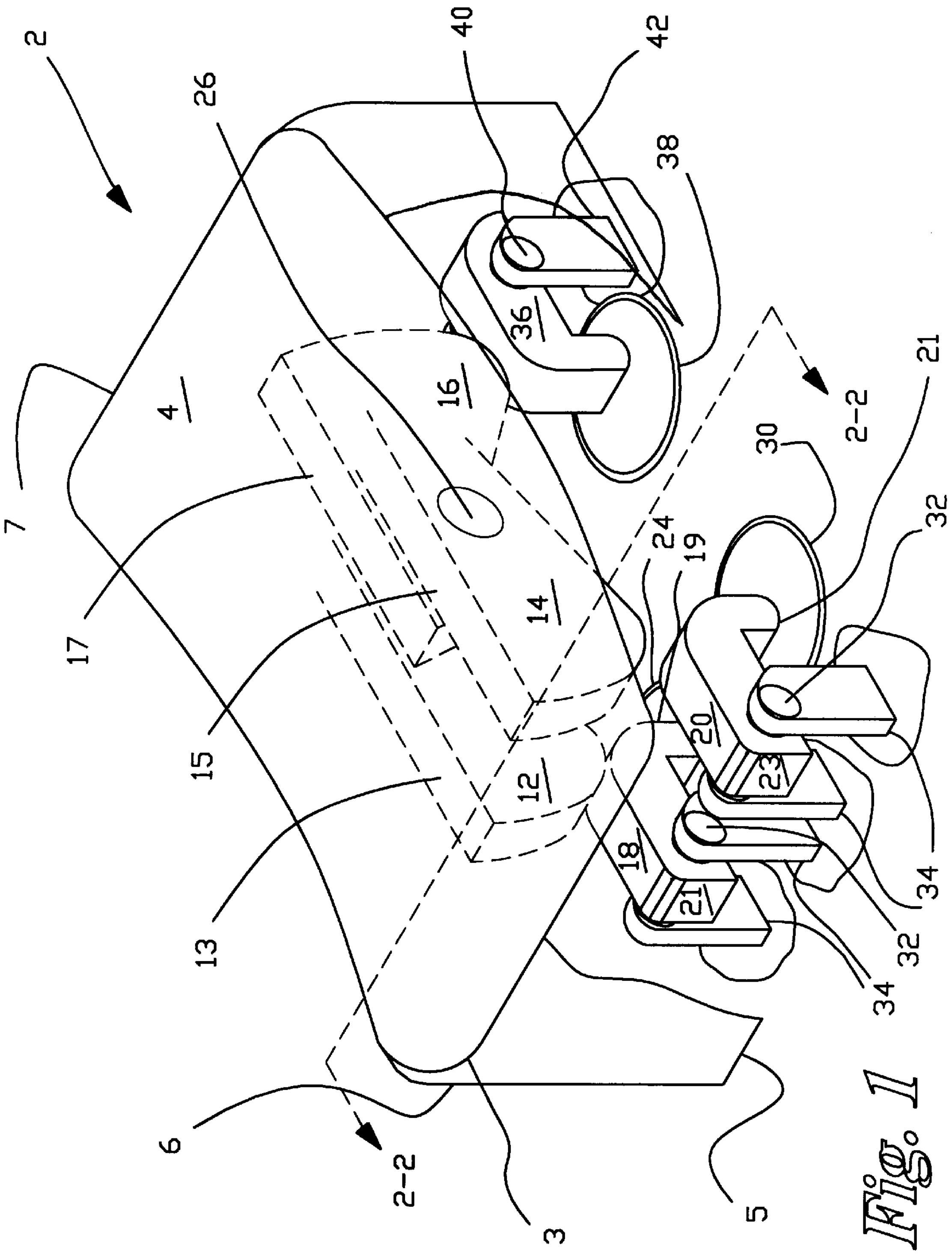
FIG. 1 is a perspective view of a button according to the present invention.

FIG. 1 shows a transparent perspective of the power window switch 2 of the present invention. The switch has a rectangular face 4 and underneath three cams 12, 14, 16 secured to the face 4 at sides 13, 15, 17. Face 4 has a top 3, bottom 5, front 6 and back 7. Cams 12 and 14 are located on the front 6 of face 4. Cam 12 and cam 14 engage bumpers 18, 20, respectively, for momentary or express movement of a power window. Thus, each cam and its bumper form a pair. Cam 12 has a relationship with bumper 18 and cam 14 has a relationship with bumper 20.

In FIG. 1, a first cam 12 actuates a first bumper 18 so that the first bumper 18 actuates a first switch 24 which, in turn, will cause a first selectable electrical response that will affect the power window(not shown). The contour of the relationship between the first cam 12 and first bumper 18 results in constant actuation of the bumper 18 to actuate the switch 24 and maintains constant pressure on the bumper 18 as the switch face 4 rotates about pivot 26. A second cam 14 then actuates a second bumper 20 for actuating a second switch 30 to have a different electrical response that will affect the window and dominate actuation by the first switch 24. The first cam 12 causes momentary movement of the window and the second cam 14 causes express movement. In further accord with the present invention, the first cam 12 may be contoured so that after actuation of the first switch 24, contact of the first bumper 18 with the first cam 12 is continuous until the second cam 14 contacts the second bumper 20. In still further accord with the present invention, it is the first bumper 18 that is contoured rather than the first cam 12.

In FIG. 1, each of bumpers 18, 20 rotates at ends 21, 23 about pivot bars 32 which are secured to stands 34. Likewise, a third bumper 36 can bc actuated by a third bumper 16 for in turn actuating a third switch 38. Third bumper 36 rotates about pivot bars 40 which are supported by stands 42. Rotation of the face 4 in a counterclockwise direction is typically for causing downward movement of the power window. Rotation of the face 4 in a clockwise direction is associated with causing third cam 16 to actuate upward movement of a power window.

Figure 2:
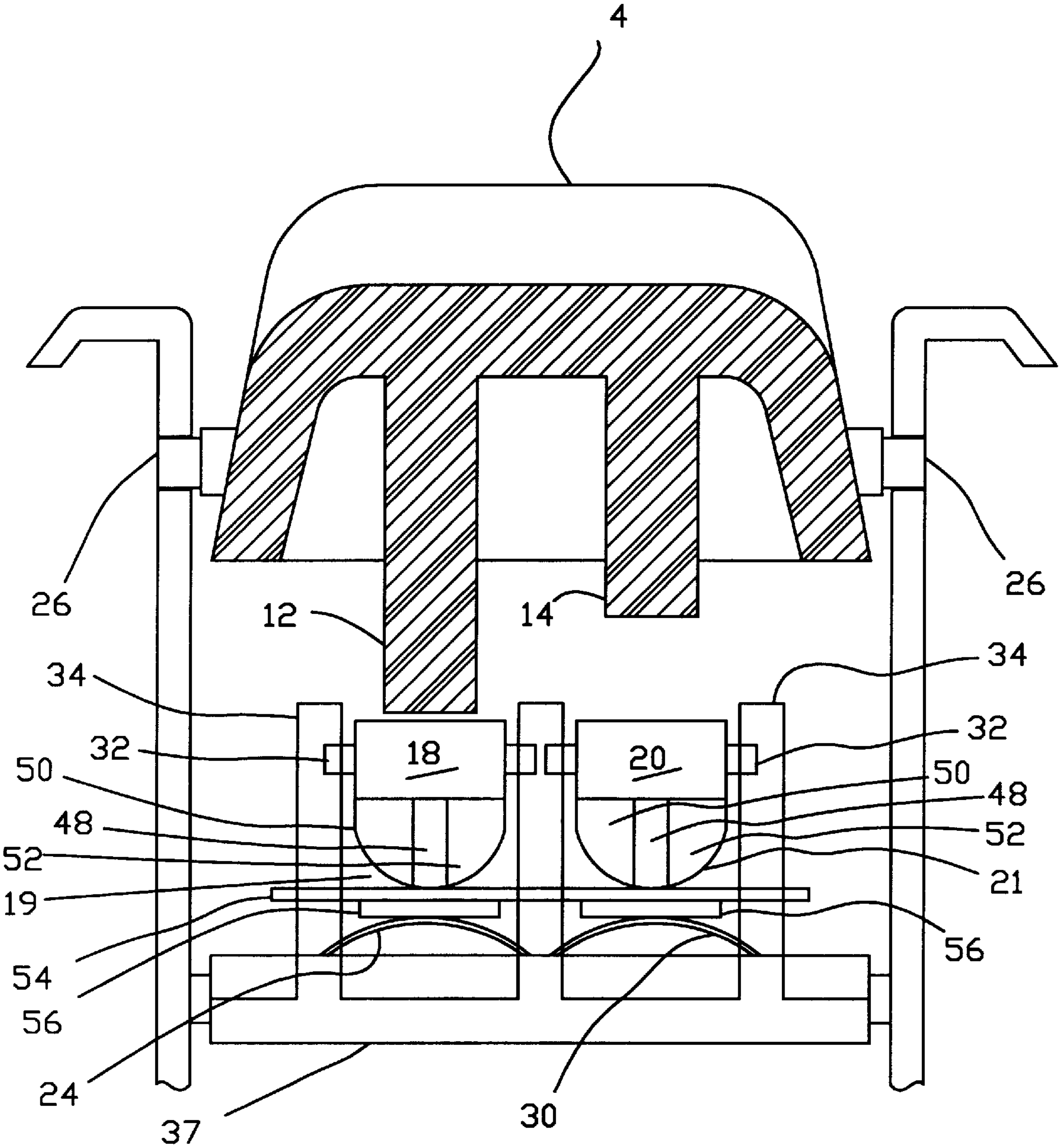
FIG. 2 is a sectional view along lines 2—2 of FIG. 1.

FIG. 2 shows a sectional view of the switch of FIG. 1 along lines 2—2. The face 4 rotates on a pivot bar 26. First and second cams 12, 14 descend from face 4 toward bumpers 18, 20. First and second cams 12, 14 are supported by pivot bars 32 which sit within stands 34 which themselves sit on a platform 37. The foot 19, 21 of each bumper 18, 20 is hemispherical. However, removed from each foot 19, 21 are the volumes of four quadrant pieces. Thus, the foot of bumper 18 shows two volumes removed leaving a portion 48 which juts out of the page and is therefore raised as compared with respect to flat portions 50, 52. The same is true of bumper 20 and 36. Benefits of this shape of bumper foot include a savings of material and weight, accurate dimensions with core walls which is critical to ensure that there are no marks on the surface foot. The embodiment of FIG. 2 is alternative to that of FIG. 1 in that rather than the bumper feet being in direct contact with the switches 24, 30, they are separated from them by a flexible mat 54 which further includes flexible nodes 56 which contact the switches 4, 30. Flexible mat 54 and flexible nodes 56 can be made of rubber or silicone. Their function is to protect the switches 24, 30 from being damage by bumpers 12, 14.

Figure 3:
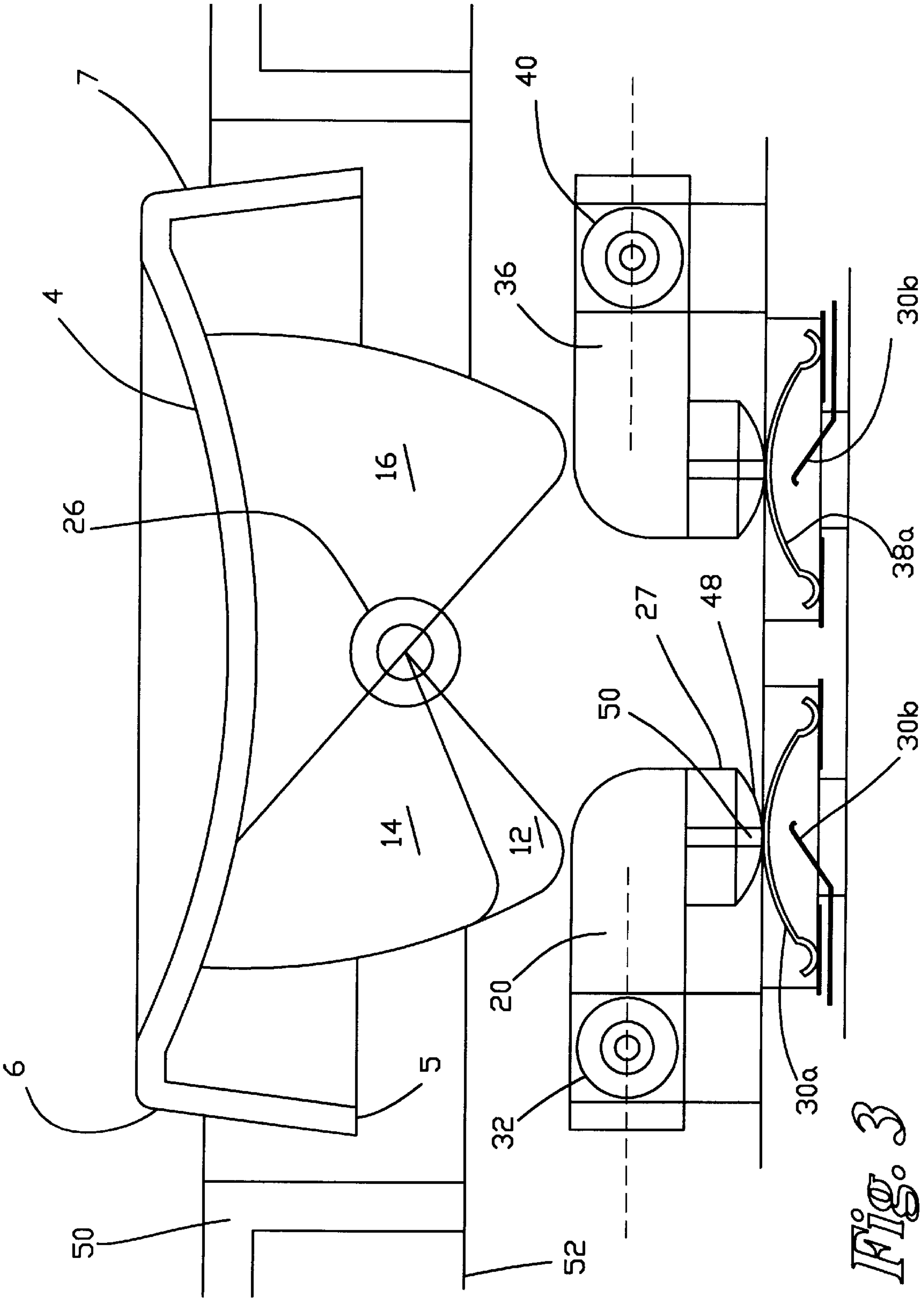
FIG. 3 is a side view of FIG. 1.

FIG. 3 is another view of the invention showing face 4 supported by pivot bar 26 within receptacle 50 which itself sits on shelf 52. First cam 12 is sized differently from second cam 14. First cam 12 is larger than second cam 14 and extends down further from face 4 such that when face 4 is pushed downardly at the front 6, first cam 12 can depress bumper 18 before second cam 14 depresses bumper 20. As in FIG. 1, a third bumper 36 which pivots about pivot bar 40 on stand 42 for depressing dome switch 38. Only second bumper 20 is shown and not also first bumper 18, but the relationship between each of the first and second bumpers 18, 20 and their respective switches 24, 30 is the same for both. Second bumper 20 depresses flexible mat, and then flexible node for depressing switch 30 which includes a conductive dome 30*a* which is pushed down by bumper 20 until flexible finger 30*b* is contacted at which point an electrical circuit is made, causing the window to be affected. In the case of bumper 20, this would mean that express mode of the window would take place. In the case of bumper 18, this would mean that momentary movement of the window would take place. The dome 30*a* and flexible finger 30*b* function substantially the same as tactile contactors 38 and flexile finger 26 shown in U.S. Pat. No. 4,436,970 incorporated herein by reference.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed:

1. A switch, comprising:

a) a button face, said face having a top, bottom, front and back, and rotating about a second pivot arm passing between the front and back of said face;

b) a first cam connected to the bottom of said face at the front end of said face;

c) a second cam connected to the bottom of said face at the front end;

d) a first bumper for rotating about a second pivot arm at one end of said first bumper when depressed by said first cam for causing a foot of said bumper to press against a conductive contact for making a first electrical circuit;

e) a second bumper, for rotating on a third pivot arm of said second bumper when depressed by said second cam for causing a foot of said bumper to press against a conductive contact for making a second electrical circuit.

2. The switch of claim 1 wherein said first cam protrudes farther from said face in the direction of said bumpers than does said second cam.

3. The switch of claim 1 wherein said making said first electrical circuit causes momentary movement of said window while making said second electrical circuit causes express movement of said window.

4. The switch of claim 1 wherein the switch is a vehicle power window switch.

5. The switch of claim 1 wherein said switch is a driver side power window switch.

6. The switch of claim 1 wherein the relationship between i) said first bumper and first cam and ii) second bumper and second cam being such that depression of the face causes said first cam to engage said first bumper for making said first electrical circuit and maintaining said first electrical contact while said face is rotated further before and until said second cam engages said second bumper for causing said second electrical circuit to be made.

7. The switch of claim 1 wherein the switch is for being pushed on by a passenger for causing momentary or express movement of a vehicle window and wherein the relationship between i) said first bumper and first cam and ii) second bumper and second cam being such that depression of the face causes said first cam to engage said first bumper for making said first electrical circuit and maintaining said first electrical contact while said face is rotated further before and until said second cam engages said second bumper for causing said second electrical circuit to be made.

8. The switch of claim 1 wherein said first electrical circuit causes upward movement of a vehicle window.

9. The switch of claim 1 wherein said second electrical circuit causes upward movement of a vehicle window.

10. The switch of claim 1 wherein said first electrical circuit causes upward movement of a vehicle window.

11. The switch of claim 1 wherein said second electrical circuit causes upward movement of a vehicle window.

12. The switch of claim 1 further including a third cam connected to the bottom of the rear end of said face for rotating on a fourth pivot arm when said button face is pressed for a fourth bumper, for rotating on a fourth pivot arm when depressed by said third cam for causing a foot of said bumper, located at an end of said bumper remote to said fourth pivot arm, to press against a conductive contact for making a third electrical circuit.

13. The apparatus of claim 1 wherein the first bumper is located underneath said first cam.

14. The switch of claim 1 wherein the second bumper is located underneath said second cam.

15. A method of moving a power window providing a button face in a vehicle, said button face having a first end and a second end;

actuating a first electrical switch by means of a first cam in response to pressing of said button for causing movement of said window in a first direction at a first speed;

actuating a second electrical switch by means of a second cam in response to pressing of said button for causing movement of said window in a first direction at a second speed.

16. The method of claim 15 further including the step of a actuating a third electrical switch by means of a third cam in response to pressing of said button for causing movement of said window in a second direction at a second speed.

17. The method of claim 15 wherein said first direction is up.

18. The method of claim 15 wherein said first direction is down.

19. The method of claim 15 wherein said second direction is up.

20. The method of claim 15 wherein said second direction is down.

* * * * *